United States Patent [19]
Puschell

[11] Patent Number: 5,438,406
[45] Date of Patent: Aug. 1, 1995

[54] TUNABLE NARROWBAND SPECTROMETER WITH ACOUSTO-OPTICAL TUNABLE FILTER

[75] Inventor: Jeffrey J. Puschell, Albuquerque, N. Mex.

[73] Assignee: The Titan Corporation, San Diego, Calif.

[21] Appl. No.: 134,188

[22] Filed: Oct. 7, 1993

[51] Int. Cl.⁶ .................... G01J 3/36; G01N 31/35
[52] U.S. Cl. ................ 356/307; 250/339.07; 356/308
[58] Field of Search .................. 356/307–308, 356/437; 359/308; 250/339.07

[56] References Cited

U.S. PATENT DOCUMENTS

| | | | |
|---|---|---|---|
| 3,792,287 | 2/1974 | Roland et al. | 307/88.3 |
| 4,115,006 | 9/1978 | Reymond et al. | 356/308 |
| 4,422,154 | 12/1983 | Smithline et al. | 356/308 |
| 4,490,845 | 12/1984 | Steinbruegge et al. | 250/339.12 X |
| 4,564,949 | 1/1986 | Trolinger | 372/93 |
| 4,893,259 | 1/1990 | Grosser et al. | 356/308 |
| 5,013,918 | 5/1991 | Choi | 250/338.4 |
| 5,022,755 | 6/1991 | Wells et al. | 356/307 |
| 5,041,723 | 8/1991 | Ishida et al. | 250/339 |
| 5,061,854 | 10/1991 | Kroutil et al. | 250/339 |
| 5,076,699 | 12/1991 | Ryan et al. | 356/437 |
| 5,081,998 | 1/1992 | Yelderman et al. | 128/719 |
| 5,097,130 | 3/1992 | Koashi et al. | 250/339 |
| 5,159,199 | 10/1992 | La Baw | 250/339 |
| 5,210,702 | 5/1993 | Bishop et al. | 364/496 |
| 5,216,484 | 6/1993 | Chao et al. | 250/339.07 X |

FOREIGN PATENT DOCUMENTS 0214129 12/1983 Japan .................. 359/308

OTHER PUBLICATIONS

Lang, NASA; "Integrated Grating Spectrometer," p. 802, Sep. 1990.
"Fiber-Coupled Acousto-Optical-Filter Spectrometer" NASA Tech Briefs, May 1993, pp. 42–43.

Primary Examiner—Vincent P. McGraw
Assistant Examiner—K. P. Hantis
Attorney, Agent, or Firm—Edward W. Callan

[57] ABSTRACT

Light from a discrete broadband visible and/or infrared light source is collimated and transmitted within an optical path that is open to an ambient environment through a spatial region of interest and is focused to a beam splitter, which splits the transmitted light into different beams and directs the different beams respectively to a pair of narrowband acousto-optical tunable filters (AOTF). One such AOTF is disposed for filtering one split transmitted light beam and is rapidly tuned through a predetermined series of different wavelengths that are characteristic of an energy absorption spectrum for a first given substance, or of a first predetermined set of given substances. The other AOTF is disposed for filtering the other split transmitted light beam and is rapidly tuned through a given substances. First and second detectors respectively detect the energy of the filtered transmitted light from the two AOTFs at each of the tuned wavelengths to provide simultaneous signals that are indicative of energy absorption spectra for the region of interest at wavelengths that are characteristic of the energy absorption spectra for the first and second given substances or for the first and second predetermined sets of given substances.

6 Claims, 1 Drawing Sheet

TUNABLE NARROWBAND SPECTROMETER WITH ACOUSTO-OPTICAL TUNABLE FILTER

BACKGROUND OF THE INVENTION

The present invention generally pertains to tunable narrowband spectrometers and is particularly directed to an improvement in such spectrometers as include an acousto-optical tunable filter (AOTF).

Spectrometers are useful for detecting the concentration of given substances in a spatial region of interest, and are commonly used in systems for a myriad of such applications, including monitoring the levels of pollutants in automobile and industrial plant emissions and detecting the presence of toxic gases in a region of interest.

The use of an acousto-optical tunable filter in a tunable narrowband spectrometer is described in an article entitled "Fiber-Coupled Acousto-Optical-Filter Spectrometer", NASA Tech Briefs, May 1993, pp.42–43. The narrowband spectrometer described therein includes a discrete broadband visible or infrared light source; a first optical system disposed in relation to the light source for collimating light from the light source, for transmitting the collimated light through an acousto-optical tunable filter and for focusing the filtered transmitted light to the input of a first optical fiber; a second optical system for collimating light from the output of the first optical fiber, for transmitting the collimated light within an optical path through a region of interest enclosed within a sample cell and for focusing the transmitted light to the input of a second optical fiber on the opposite side of the region of interest from the first optical fiber. The filter is tuned through a predetermined series of different wavelengths that are characteristic of an energy absorption spectrum for one or more given substances; and a detector is coupled to the output of the second optical fiber for detecting the energy of the filtered transmitted light at each of the different tuned wavelengths to thereby provide a signal indicative of an energy absorption spectrum for the region of interest at wavelengths that are characteristic of the energy absorption spectrum for the one or more given substances.

SUMMARY OF THE INVENTION

The present invention provides a tunable discrete narrowband spectrometer, comprising a broadband light source; an optical system disposed in relation to the light source for transmitting light from the light source within an optical path through a spatial region of interest and for focusing the transmitted light on the opposite side of the region of interest from the light source; a first narrowband acousto-optical tunable filter disposed for filtering said transmitted light; first tuning means coupled to the first filter for tuning the first filter through a predetermined series of different wavelengths that are characteristic of an energy absorption spectrum for a first given substance; and a first detector disposed for detecting the energy of the transmitted light filtered by the first filter at each of said different tuned wavelengths to thereby provide a signal indicative of an energy absorption spectrum for said region of interest at wavelengths that are characteristic of said energy absorption spectrum for said first given substance; wherein the first filter is disposed between the optical system and the first detector; a second narrowband acousto-optical tunable filter disposed for filtering said transmitted light; means disposed in relation to said optical system and the two filters for splitting the transmitted light into different light beams and for respectively directing said different light beams to the two filters; second tuning means coupled to the second filter for tuning the second filter through a second predetermined series of different wavelengths that are characteristic of an energy absorption spectra for a second given substance; and a second detector disposed for detecting the energy of said transmitted light filtered by the second filter at each of said second predetermined series of different tuned wavelengths to thereby provide a signal indicative of an energy absorption spectrum for said region of interest at wavelengths that are characteristic of said energy absorption spectrum for said second given substance.

Additional features of the present invention are described in relation to the detailed description of the preferred embodiments.

DETAILED DESCRIPTION

Figure 1:
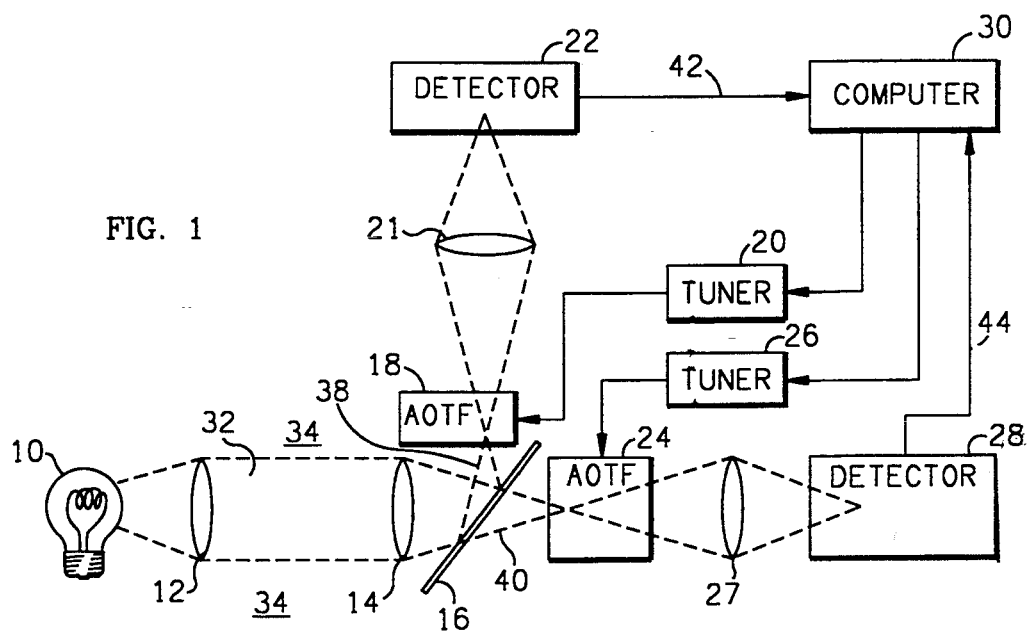
FIG. 1 is a block diagram of a preferred embodiment of the tunable narrowband spectrometer of the present invention.

Referring to FIG. 1, one preferred embodiment of a tunable narrowband spectrometer according to the present invention includes a broadband light source 10, an optical system including a collimating lens 12 and a collection lens 14, a beam splitter 16, a first narrowband acousto-optical tunable filter 18, a first tuner 20, a first focusing lens 21, a first detector 22, a second narrowband acousto-optical tunable filter 24, a second tuner 26, a second focusing lens 27, a second detector 28 and a computer 30. Preferably, both filters 18, 24 include a tellurium dioxide crystal as the acousto-optical element.

The light source 10 provides a broadband of visible and/or infrared light.

The optical system is disposed in relation to the light source 10 such that the collimating lens 12 collimates light from the light source 10 and transmits the collimated light within an optical path 32 through a region of interest 34 to the collection lens 14, which focuses the transmitted light on the opposite side of the region of interest 34 from the light source 10. The optical path 32 is open to an ambient environment.

The beam splitter 16 is disposed adjacent the collection lens 14 for splitting the transmitted light into two different beams 38, 40, which are respectively directed to and focused at the two filters 18, 24.

The first filter 18 and the second filter 24 are disposed for filtering the different light beams 38, 40 respectively directed thereto by the beam splitter 16.

The first tuner 20 is coupled to the first filter 18 for rapidly tuning the first filter 18 through a first predetermined series of different wavelengths that are characteristic of an energy absorption spectrum for a first given substance, or of energy absorption spectra for a first predetermined set of given substances. The first tuner 20 also is adapted for tuning the first filter 18 to a wavelength that is uncharacteristic of the energy absorption spectrum for the first given substance, or for the first given set of given substances, and for any other substances that may be present in the region of interest. The operation of the first tuner 20 is controlled by the computer 30.

The first focusing lens 21 focuses the filtered transmitted light from the first filter 18 at the first detector 22, which is disposed on the other side of the first filter 18 from the beam splitter 16 for detecting the energy of the filtered transmitted light at each of the different tuned wavelengths at which the first filter 18 is tuned. The first detector 22 responds to energy detected at the first predetermined series of different wavelengths by providing on line 42 a first signal that is indicative of an energy absorption spectrum for the region of interest at the wavelengths that are characteristic of the energy absorption spectrum for the first given substance, or of energy absorption spectra for the first predetermined set of given substances. The first detector 22 responds to energy detected at the uncharacteristic wavelength by providing on line 42 a second signal that is indicative of background energy absorption for the region of interest.

The computer 30 processes the energy-absorption-spectrum signal provided on line 42 by the first detector 22 with the background-energy-absorption signal provided on line 42 by the first detector 22 to determine the concentration of the first given substance or the first predetermined set of given substances in the region of interest.

The second tuner 26 is coupled to the second filter 24 for rapidly tuning the second filter 24 through a second predetermined series of different wavelengths that are characteristic of an energy absorption spectrum for a second given substance, or of energy absorption spectra for a second predetermined set of given substances. The second tuner 26 also is adapted for tuning the second filter 24 to a wavelength that is uncharacteristic of the energy absorption spectrum for the second given substance, or for the second given set of given substances, and for any other substances that may be present in the region of interest. The operation of the second tuner 26 also is controlled by the computer 30.

The second focusing lens 27 focuses the filtered transmitted light from the second filter 24 at the second detector 28, which is disposed on the other side of the second filter 24 from the beam splitter 16 for detecting the energy of the filtered transmitted light at each of the different tuned wavelengths at which the second filter 24 is tuned. The second detector 28 responds to energy detected at the second predetermined series of different wavelengths by providing on line 44 a first signal that is indicative of an energy absorption spectrum for the region of interest at the wavelengths that are characteristic of the energy absorption spectrum for the second given substance, or of energy absorption spectra for the second predetermined set of given substances. The second detector 28 responds to energy detected at the uncharacteristic wavelength by providing on line 44 a second signal that is indicative of background energy absorption for the region of interest.

The computer 30 processes the energy-absorption-spectrum signal provided on line 44 by the second detector 28 with the background-energy-absorption signal provided on line 44 by the second detector 28 to determine the concentration of the second given substance or the second predetermined set of given substances in the region of interest.

In an alternative mode of operation with the preferred embodiment of FIG. 1, the first tuner 20 is adapted for tuning the first filter 18 through a predetermined series of different wavelengths that are characteristic of an energy absorption spectrum for a given substance, or of energy absorption spectra for a predetermined set of given substances; the second tuner 26 is adapted for tuning the second filter 24 to a wavelength that is uncharacteristic of the energy absorption spectrum for the given substance(s) and for any other substances that may be present in the region of interest; the first detector 20 responds to energy detected at the predetermined series of different wavelengths by providing on line 42 a signal that is indicative of an energy absorption spectrum for the region of interest at the wavelengths that are characteristic of the energy absorption spectrum for the given substance, or of energy absorption spectra for the predetermined set of given substances; the second detector 28 responds to energy detected at the uncharacteristic wavelength by providing on line 44 a signal that is indicative of background energy absorption for the region of interest; and the computer 30 processes the energy-absorption-spectrum signal provided on line 42 by the first detector 22 with the background-energy-absorption signal provided on line 44 by the second detector 28 to determine the concentration of the given substance(s) in the region of interest.

Figure 2:
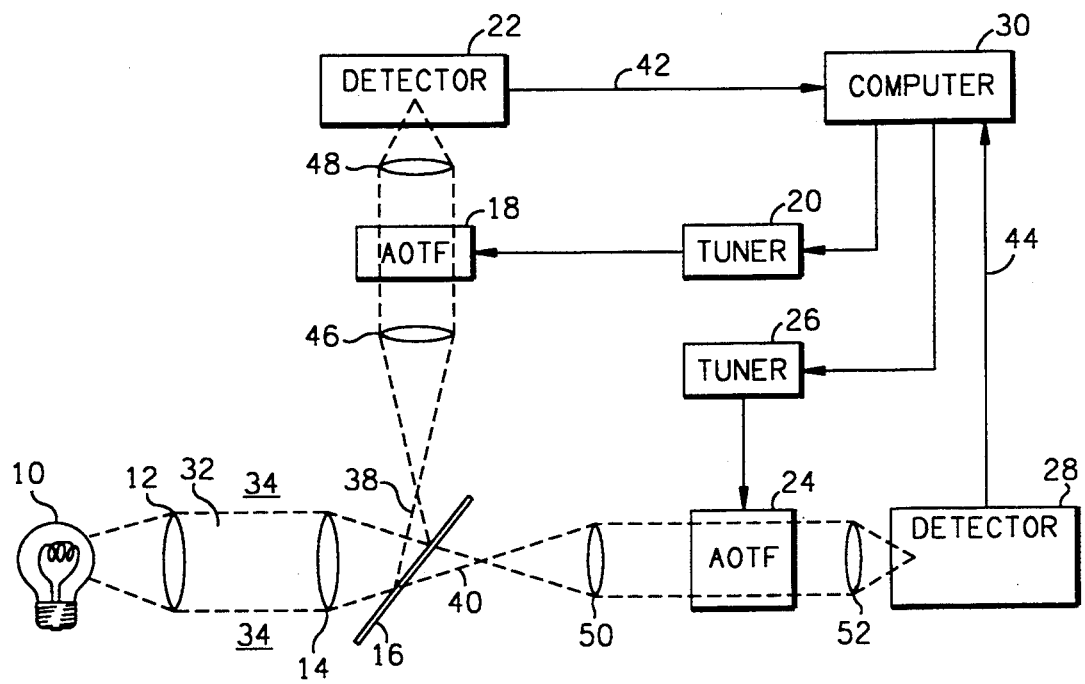
FIG. 2 is a block diagram of an alternative preferred embodiment of the tunable narrowband spectrometer of the present invention.

Referring to FIG. 2, an alternative preferred embodiment of a tunable narrowband spectrometer according to the present invention includes a broadband light source 10, an optical system including a collimating lens 12 and a collection lens 14, a beam splitter 16, a first narrowband acousto-optical tunable filter 18, a first tuner 20, a first detector 22, a second narrowband acousto-optical tunable filter 24, a second tuner 26, a second detector 28 and a computer 30, all of which are disposed and may be adapted to operate in the same manner as described above for the like-number components included in the preferred embodiment of the spectrometer shown in FIG. 1, except that the two different beams of light 38, 40 are not respectively directed to and focused at the two filters 18, 24.

The alternative preferred embodiment of the spectrometer shown in FIG. 2 further includes a second collimating lens 46, a second collection lens 48, a third collimating lens 50 and a third collection lens 52. The second collimating lens 46 collimates the first light beam 38 from the beam splitter 16 and transmits such collimated light within an optical path 54 through the first filter 18 to the second collection lens 48, which focuses such filtered light at the first detector 22. The third collimating lens 50 collimates the second light beam 40 from the beam splitter 16 and transmits such collimated light within an optical path 56 through the second filter 24 to the third collection lens 52, which focuses such filtered light at the second detector 28.

I claim:
1. A tunable narrowband spectrometer comprising
a discrete broadband light source;
an optical system disposed in relation to the light source for transmitting light from the light source within an optical path through a spatial region of interest and for focusing the transmitted light on the opposite side of the region of interest from the light source;
a first narrowband acousto-optical tunable filter disposed for filtering said transmitted light;
first tuning means coupled to the first filter for tuning the first filter through a predetermined series of different wavelengths that are characteristic of an energy absorption spectrum for a first predetermined set of given substances;

a first detector disposed for detecting the energy of the transmitted light filtered by the first filter at each of said different tuned wavelengths to thereby provide a signal indicative of an energy absorption spectrum for said region of interest at wavelengths that are characteristic of said energy absorption spectrum for said first predetermined set of given substances;

wherein the first filter is disposed between the optical system and the first detector;

a second narrowband acousto-optical tunable filter disposed for filtering said transmitted light;

means disposed in relation to said optical system and the two filters for splitting the transmitted light into different light beams and for respectively directing said different light beams to the two filters;

second tuning means coupled to the second filter for tuning the second filter through a second predetermined series of different wavelengths that are characteristic of energy absorption spectra for a second predetermined different set of given substances; and a second detector disposed for detecting the energy of said transmitted light filtered by the second filter at each of said second predetermined series of different tuned wavelengths to thereby provide a signal indicative of an energy absorption spectrum for said region of interest at wavelengths that are characteristic of said energy absorption spectra for said second predetermined set of given substances.

2. A spectrometer according to claim 1, wherein the first tuning means is adapted for also tuning the first filter to a wavelength that is uncharacteristic of said energy absorption spectrum for said first predetermined set of given substances; and wherein the first detector responds to the detection of energy of said transmitted light filtered by the first filter at said tuned uncharacteristic wavelength by providing a signal indicative of background energy absorption for said region of interest.

3. A spectrometer according to claim 2, wherein the second tuning means is adapted for also tuning the second filter to a second wavelength that is uncharacteristic of said energy absorption spectrum for said second predetermined set of given substances; and wherein the second detector responds to the detection of energy of said transmitted light filtered by the second filter at said tuned second uncharacteristic wavelength by providing a signal indicative of background energy absorption for said region of interest.

4. A tunable narrowband spectrometer, comprising a discrete broadband light source;

an optical system disposed in relation to the light source for transmitting light from the light source within an optical path through a spatial region of interest and for focusing the transmitted light on the opposite side of the region of interest from the light source;

a first narrowband acousto-optical tunable filter disposed for filtering said transmitted light;

first tuning means coupled to the first filter for tuning the first filter through a predetermined series of different wavelengths that are characteristic of an energy absorption spectrum for a given substance;

a first detector disposed for detecting the energy of the transmitted light filtered by the first filter at each of said different tuned wavelengths to thereby provide a signal indicative of an energy absorption spectrum for said region of interest at wavelengths that are characteristic of said energy absorption spectrum for said given substance;

wherein the first filter is disposed between the optical system and the first detector;

a second narrowband acousto-optical tunable filter disposed for filtering said transmitted light;

means disposed in relation to said optical system and the two filters for splitting the transmitted light into different light beams and for respectively directing said different light beams to the two filters;

second tuning means coupled to the second filter for tuning the second filter through a second predetermined series of different wavelengths that are characteristic of an energy absorption spectra for a second given substance; and a second detector disposed for detecting the energy of said transmitted light filtered by the second filter at each of said second predetermined series of different tuned wavelengths to thereby provide a signal indicative of an energy absorption spectrum for said region of interest at wavelengths that are characteristic of said energy absorption spectrum for said second given substance.

5. A spectrometer according to claim 4, wherein the first tuning means is adapted for also tuning the first filter to a wavelength that is uncharacteristic of said energy absorption spectrum for said first given substance; and wherein the first detector responds to the detection of energy of said transmitted light filtered by the first filter at said tuned uncharacteristic wavelength by providing a signal indicative of background energy absorption for said region of interest.

6. A spectrometer according to claim 5, wherein the second tuning means is adapted for also tuning the second filter to a second wavelength that is uncharacteristic of said energy absorption spectrum for said second given substance; and wherein the second detector responds to the detection of energy of said transmitted light filtered by the second filter at said tuned second uncharacteristic wavelength by providing a signal indicative of background energy absorption for said region of interest.

* * * * *